May 19, 1964 — M. W. WOLFE — 3,133,586
REPAIR ELEMENT FOR TIRE
Filed Nov. 15, 1962 — 2 Sheets-Sheet 1
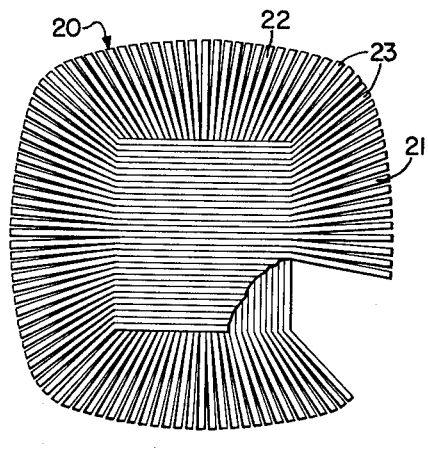
FIG. 1
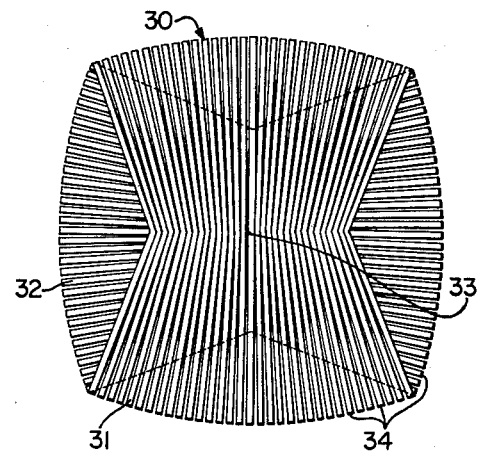
FIG. 2
FIG. 3
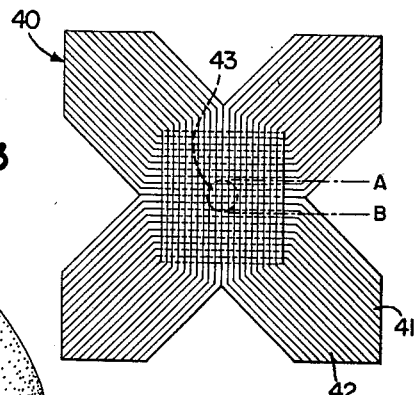
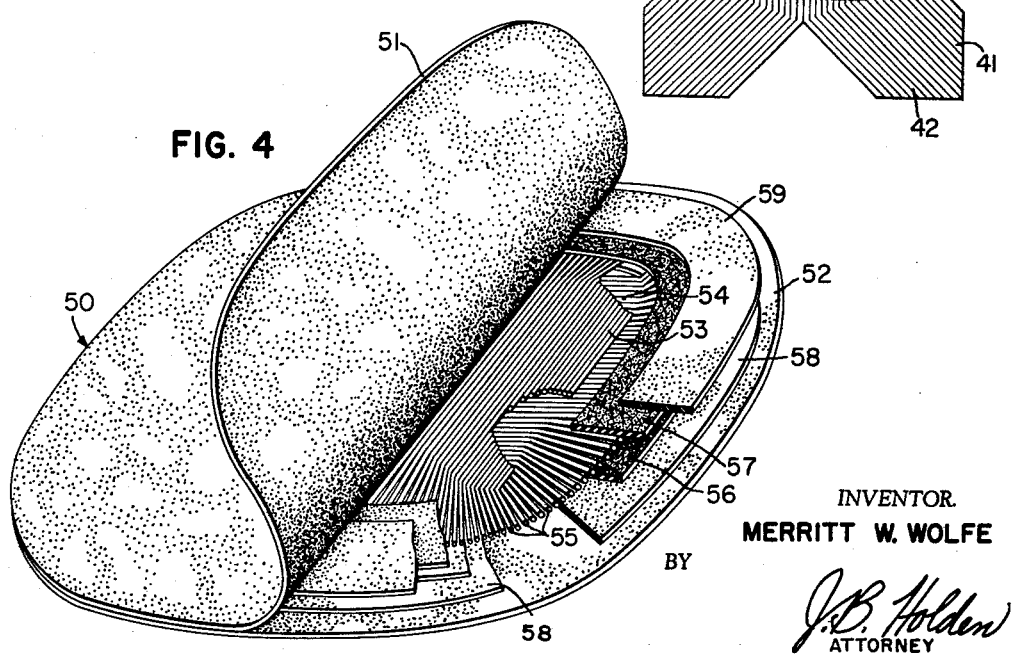
FIG. 4
INVENTOR.
MERRITT W. WOLFE
BY
J.B. Holden
ATTORNEY May 19, 1964  M. W. WOLFE  3,133,586
REPAIR ELEMENT FOR TIRE
Filed Nov. 15, 1962  2 Sheets-Sheet 2
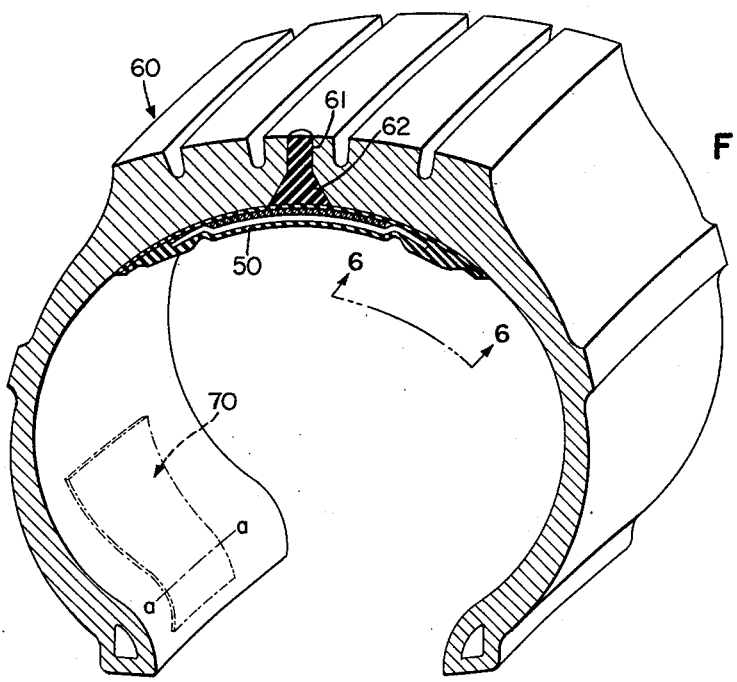
FIG. 5
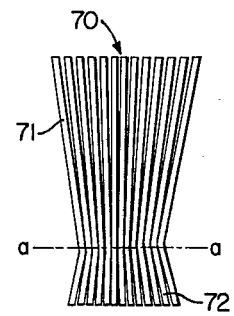
FIG. 7
FIG. 6
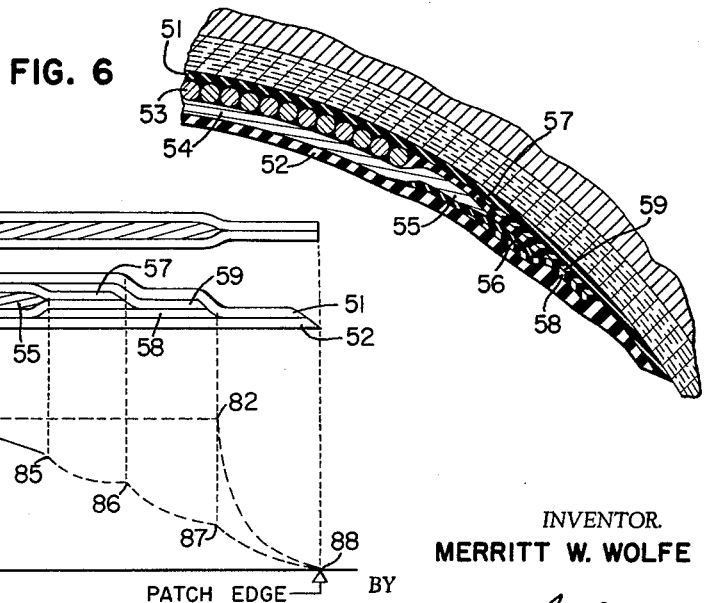
FIG. 8
INVENTOR.
MERRITT W. WOLFE
BY J.B. Holden
ATTORNEY United States Patent Office 3,133,586
Patented May 19, 1964

3,133,586
REPAIR ELEMENT FOR TIRE
Merritt W. Wolfe, Akron, Ohio, assignor to The Goodyear Tire & Rubber Company, Akron, Ohio, a corporation of Ohio
Filed Nov. 15, 1962, Ser. No. 237,917
6 Claims. (Cl. 152—367)

This invention relates to a tire repair patch and, more particularly, to a repair element utilized in reinforcing or repairing the ruptured portion of a tire casing. The invention has to do specifically with a patch for repairing injured pneumatic tire casings. The repair patch includes a plurality of ply members disposed in superposed relationship and coupled with an underlying layer of unvulcanized rubber which is adapted to be placed over the injury in the tire carcass, then vulcanized in position, thus becoming an integral part of the tire casing.

Certain prior repair patches are composed of a plurality of layers, each containing parallel cord reinforcement associated with a layer of rubber to hold them together. It is common in the art to orientate the reinforcement plies in crossed relationship with one another, then position the patch so that the cords therein extend in substantially the same direction as the cords in the tire casing. Furthermore, it is also common to place additional transverse reinforcement strips over the edge where the cord ends terminate in an attempt to reduce fatigue cracking at the discontinuity. The importance of preventing cracks from occurring at the edge of tire repair patches is particularly important with the advent of the two-ply tire. The two-ply tire utilizes large cords and is designed to flex a greater extent under normal operating conditions. The repair patches for the large cord tires require larger-than-normal cords capable of carrying a correspondingly larger load. Transmitting the load to and from the large cord patch also necessitates a better distribution of the stress concentration at the cord ends. Because of the greater cord diameter there exists a greater discontinuity at the cord end; therefore, it is very beneficial to reduce the overall thickness of cord reinforcement without impairing its load-carrying capabilities.

The primary object of this invention is to provide a tire repair patch with the reinforcement cords so orientated that fatigue cracking along the edges of the patch is eliminated or greatly reduced.

Another object of the invention is to provide a tire repair patch of the type indicated in which the tensile and compressive stresses at the edge of the patch are minimized, thus increasing the life of the tire repair.

An additional object of the present invention is to increase the bonding surface at the cord ends within the patch, thus reducing the load per unit length of patch edge.

A further object of the invention is to provide a tire repair patch wherein the reinforcement cord ends are spread out, thus providing a greater range of patch orientation with respect to the cords within the tire casing.

Further and more specific objects will be apparent from the description taken in connection with the accompanying drawings, in which FIG. 1 is a plan view of a repair patch in which the cords fan outwardly at the edges;

FIG. 2 is a plan view of a repair patch in which the cords angle outwardly from the center thereof;

FIG. 3 shows a repair patch in plan view wherein the cords are angled so as to produce extended corners;

FIG. 4 is an isometric view of a repair patch with parts broken away to show the edge reinforcement strips;

FIG. 5 is a perspective view partly in cross section of a tire containing a repair patch of the present invention;

FIG. 6 is an enlarged sectional view taken along line 6—6 of FIG. 5;

FIG. 7 shows a further embodiment of a patch containing unidirectional reinforcement cords;

FIG. 8 shows a graphical representation of the load at the patch edge.

Referring to FIG. 1 of the drawings, a patch 20 is shown wherein the outer portions of layer 21 and layer 22 have the cords 23 therein angularly disposed so that the entire corners become load-carrying areas. The utilization of the corner areas reduces the load concentration per unit of patch width. The cords in the peripheral area are also advantageously located in a single plane.

The patch 30 shown in FIG. 2 is comprised of two layers of cord reinforcement 31 and 32 which are orientated at essentially 90° with each other. The individual cords are angled outwardly beginning at the center 33 of patch 30. This particular configuration carries the load outwardly in a direct path to the increased peripheral area where the ends 34 are spread out, thus lowering the stress concentrations at the edge of patch 30.

FIG. 3 shows another version of a repair patch 40 that is fabricated from two layers 41 and 42 of reinforcement cord arranged at right angles to one another. The cords from each layer are angled toward the corners, thus providing a bonding area into which all the patch cords can come in contact with tire carcass cords that are not interrupted by the ruptured area. For example, the cords in the tire carcass laying in the area between lines A and B are all interrupted by having their ends terminate at hole 43.

FIG. 4 shows a broken away view of a repair patch 50 that is sandwiched between two layers of gum stock 51 and 52. Layers of reinforcement cord 53 and 54 are disposed at essentially right angles to one another with the cord edges thereof spread apart as at 55. The spread apart reinforcement cord edge is then positioned so that the end of the cords 55 are between layers 56 and 57 which are composed of gum stock impregnated with wire filaments in random orientation. Additional edge strips 58 and 59 containing a flocked filament material such as nylon or rayon are positioned such that they partially overlap strips 56 and 57, thus helping to step down the patch edge load gradually.

FIG. 5 depicts a portion of a tire carcass 60 in which a patch 50 has been installed. The ruptured area 61 has been repaired in the conventional manner by using a rubber plug 62 that is securely bonded with the rubber stock of the tire. Patch 50 is bonded so that it adheres to the tire reinforcement cords and plug 62.

FIG. 6 is an enlarged sectional view taken along line 6—6 of FIG. 5 and shows the transitional zone between the patch edge and the tire carcass. Cords 53 are shown in section and cords 54 terminate with spread apart ends 55. The layers 56 and 57 of gum rubber containing wire reinforcement are shown on both sides of ends 55. Edge strips 58 and 59 which contain flocked filaments then overlay the ends of strips 56 and 57.

FIG. 7 shows the reinforcement cords of a patch 70 particularly useful in repairing tires in which the primary reinforcement cords are radially aligned. The cords on end 71 angle outwardly from line a—a, thus paralleling the radially aligned reinforcement in the carcass. The end 72 also fans out laterally, thus providing for better longitudinal elongation over the entire patch length. The particular patch location on the tire carcass is outlined on the inside wall of tire portion shown in FIG. 5. Since the sidewall is subject to a large amount of flexure during the operation of the tire, it is necessary that the repair patch can also flex without fatigue cracking at the edges thereof. In addition to relieving the longitudinal movement within the patch, the spreading of the reinforcement cords as at 71 and 72 provides a greater bonding area, thus reducing the load per unit length of patch edge.

FIG. 8 shows graphically how the load is reduced in magnitude near the edge of the repair patch. A conventional patch made with 6720/3 cord is shown at 80. The load per inch of patch width must be reduced from the 4250 pounds per inch at 82 to a zero load per inch at 88. This transition in load must take place over an extremely short distance, thus placing a severe stress concentration at the patch edge which ultimately results in patch edge lifting. The patch shown at 81 contains the basic elements as described in conjunction with FIG. 6. At 84 the entire load per inch is contained in cords 54. As cords 54 spread out, there is a marked reduction in the load per inch, as shown in the drop between points 84 and 85. The rubber stock containing wire reinforcement provides a further transition in load reduction as shown between points 85 and 86. The drop in load between points 86 and 87 is attributable to the filament impregnated rubber strips 58 and 59. The remainder of the load is carred by the layers of gum rubber 51 and 52 which accounts for the final load drop between points 87 and the patch edge at 88. Note that the drop in load of patch 81 is far more gradual than that of patch 80.

As heretofore stated, the spread apart edges of the reinforcement cords spread the load carried by the patch over a greater area, thus reducing the load per inch of patch edge. The spread apart cord edges work in conjunction with the wire and filament impregnated gum rubber strips. The wire reinforced rubber stock contains up to 9% by volume of a brass-coated steel wire which is thoroughly mixed with 91% by volume of rubber compound. During the mixing or calendering operation, the individual wires become randomly mixed; however, there is a resulting lower elongation and higher tensile strength in the direction of calendering, as compared to a direction more or less transverse thereof. The rubber stock containing the flocked nonmetallic filaments also exhibits a strength predominately greater in the direction of fiber orientation.

In order to better cope with the discontinuity at the edge of a repair patch, the reinforcement strips as herein presented tend to reduce the fatigue cracking which ultimately progresses to failure of the entire patch. The ability of the filament-reinforced rubber stock, whether it be metallic or fiber, to prevent edge cracking can be further enhanced by cutting the sheet material into strips so that the direction of reinforcement is angularly disposed with respect to the length of the rubber strip.

As an example of the effect of such orientation at 30° of the reinforcement, a typical rubber compound having a modulus at 40% elongation of 200 p.s.i. will have, when mixed with 3.6% volume of steel wire filaments, a modulus at 40% elongation of nearly 900 p.s.i. in a direction parallel to the direction of calendering and in the range of 500 p.s.i. in a direction transverse to the direction of calendering. When 7.5% volume of nylon fibers ½ inch long are mixed with a typical rubber compound the modulus at 40% elongation is 1800 p.s.i. in a direction parallel to the direction of calendering and approximately 300 p.s.i. in a direction transverse to the direction of calendering.

While certain representative embodiments and details have been shown for the purpose of illustrating the invention, it will be apparent to those skilled in this art that various changes and modifications may be made therein without departing from the spirit or scope of the invention.

I claim:

1. A tire repair patch having reinforcement cord therein, the ends of said cord being spread apart transversely with respect to the longitudinal cord direction so that the edge of the patch has an increased bonding area.

2. A tire repair patch as claimed in claim 1 in which a plurality of layers of vulcanizable rubber-coated reinforcement cord are adhered to each other with the cords thereof in angularly disposed relationship to one another.

3. A tire repair patch as claimed in claim 2 in which the spread apart cords are co-planar in the region of the patch periphery.

4. A tire reair patch as claimed in claim 3 wherein a plurality of edge reinforcement strips are positioned adjacent and in contact with the entire edge of the spread apart cord ends.

5. A tire repair patch as claimed in claim 4 in which the reinforcement strips contiguous said cord ends contain randomly oriented wire filaments and the most peripheral reinforcement strips contain non-metallic flocked fibrous filaments.

6. In combination a tire containing a ruptured area and a repair patch vulcanized thereon, said patch comprising a plurality of layers of rubber-coated reinforcement cord, said cord in one layer being angularly disposed with respect to the reinforcement cord in the adjacent layer, the ends of said cord being spread apart transversely to cover an area greater than the original cord area, said spread apart cord ends sandwiched between strips of randomly oriented wire impregnated rubber stock and edge reinforcement strips containing non-metallic flocked filaments, and said strips disposed in overlapped relationship so that they extend beyond the marginal edge of said repair patch.

References Cited in the file of this patent

UNITED STATES PATENTS

| | | |
|---|---|---|
| 1,903,406 | Putvin | Apr. 4, 1933 |
| 1,979,371 | Diack | Nov. 6, 1934 |
| 3,004,580 | Chambers et al. | Oct. 17, 1961 |

FOREIGN PATENTS

| | | |
|---|---|---|
| 703,232 | France | Feb. 2, 1931 |